US011663924B2

(12) United States Patent
Tang

(10) Patent No.: US 11,663,924 B2
(45) Date of Patent: May 30, 2023

(54) METHOD FOR LIVE STREAMING

(71) Applicant: BEIJING DAJIA INTERNET INFORMATION TECHNOLOGY CO., LTD., Beijing (CN)

(72) Inventor: Xiao Tang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/715,350

(22) Filed: Apr. 7, 2022

(65) Prior Publication Data

US 2022/0230553 A1 Jul. 21, 2022

Related U.S. Application Data

(63) Continuation of application No. PCT/CN2021/106715, filed on Jul. 16, 2021.

(30) Foreign Application Priority Data

Nov. 9, 2020 (CN) .......................... 202011241042.6

(51) Int. Cl.
*G09B 5/06* (2006.01)
*H04N 21/2187* (2011.01)
(Continued)

(52) U.S. Cl.
CPC ......... *G09B 5/065* (2013.01); *H04N 21/2187* (2013.01); *H04N 21/2393* (2013.01); *A63F 13/86* (2014.09); *A63F 2300/577* (2013.01)

(58) Field of Classification Search
CPC ............... G09B 5/065; H04N 21/2187; H04N 21/2393; H04N 21/2543; H04N 21/4756;
(Continued)

(56) References Cited

U.S. PATENT DOCUMENTS

2002/0046638 A1* 4/2002 Wright ................ G09B 15/023
84/612
2014/0215333 A1* 7/2014 Dhanyamraju .... H04N 21/8455
715/716
(Continued)

FOREIGN PATENT DOCUMENTS

CN       101400149 A      4/2009
CN       102664924 A      9/2012
(Continued)

OTHER PUBLICATIONS

International Search Report of the International Searching Authority for State Intellectual Property Office of the People's Republic of China in PCT application No. PCT/CN2021/106715 dated Sep. 28, 2021, which is an international application corresponding to this U.S. application.

(Continued)

*Primary Examiner* — Adil Ocak
(74) *Attorney, Agent, or Firm* — Koiitch Romano Dascenzo Gates LLC

(57) ABSTRACT

A method for live streaming is provided. The method includes: displaying an online tutorial portal of a target service in a live-streaming room of an anchor account; in response to a trigger operation on the online tutorial portal, sending an online tutorial request to a server to request the anchor account to provide an online tutorial for the target service; in response to approval of the anchor account for the online tutorial request, acquiring video data by recording a current screen of a first terminal; displaying, in the live-streaming room of the anchor account, the current screen of the first terminal based on the video data; playing, in response to receiving audio data of the anchor account, the audio data of the anchor account; and acquiring audio data (Continued)

of a first account corresponding to the first terminal, and sending the audio data of the first account to the server.

15 Claims, 6 Drawing Sheets

(51) Int. Cl.
*H04N 21/239* (2011.01)
*A63F 13/86* (2014.01)

(58) Field of Classification Search
CPC ............ H04N 21/4334; H04N 21/4781; A63F 13/86; A63F 2300/577
See application file for complete search history.

(56) References Cited

U.S. PATENT DOCUMENTS

| | | | |
|---|---|---|---|
| 2015/0135234 A1 | 5/2015 | Hall | |
| 2018/0285991 A1* | 10/2018 | Wickersham | ........ G06Q 50/167 |
| 2018/0295175 A1 | 10/2018 | Smith et al. | |
| 2018/0301048 A1 | 10/2018 | Almassizadeh et al. | |
| 2019/0281327 A1* | 9/2019 | Li | ...................... H04N 21/2541 |
| 2021/0021663 A1 | 1/2021 | Zhou et al. | |
| 2021/0044640 A1* | 2/2021 | He | ......................... G10L 15/26 |

FOREIGN PATENT DOCUMENTS

| | | |
|---|---|---|
| CN | 108920225 A | 11/2018 |
| CN | 110290392 A | 9/2019 |
| CN | 110381330 A | 10/2019 |
| CN | 112423008 A | 2/2021 |

OTHER PUBLICATIONS

The State Intellectual Property Office of People's Republic of China, First Office Action in Patent Application No. CN202011241042.6 dated Jun. 16, 2021, which is a foreign counterpart application corresponding to this U.S. Patent Application, to which this application claims priority.
Notification of Completion of Formalities for Patent Register and Notification to Grant Patent Right for Invention Application No. 202011241042.6 dated Sep. 29, 2021.
Extended European Search Report Communication Pursuant to Rule 62 EPC, dated Dec. 16, 2022 in Patent Application No. EP 21876747.3, which is a foreign counterpart to this U.S. Application.

* cited by examiner

METHOD FOR LIVE STREAMING

CROSS-REFERENCE TO RELATED APPLICATION

The present disclosure is a continuation application of International Application No. PCT/CN2021/106715, filed on Jul. 16, 2021, which claims priority to Chinese Patent Application No. 202011241042.6, filed on Nov. 9, 2020, the contents of which are herein incorporated by reference in their entireties.

TECHNICAL FIELD

The present disclosure relates to the field of live-streaming technologies, and in particular, relates to a method for live streaming.

BACKGROUND

In the field of game live streaming, users can learn game skills by watching a game anchor playing games during live streaming, and then practice after the live streaming to improve their own game skills.

SUMMARY

Embodiments of the present disclosure provide a method for live streaming.

According to one aspect of the embodiments of the present disclosure, a method for live streaming is provided. The method is performed by a first terminal and includes: displaying an online tutorial portal of a target service in a live-streaming room of an anchor account; sending an online tutorial request to a server in response to detecting a trigger operation on the online tutorial portal, wherein the online tutorial request is configured to request the anchor account to provide an online tutorial for the target service; acquiring video data by recording a current screen of the first terminal in response to approval of the anchor account for the online tutorial request; displaying, in the live-streaming room of the anchor account, the current screen of the first terminal based on the video data; playing, in response to receiving audio data of the anchor account, the audio data of the anchor account in the live-streaming room of the anchor account; and acquiring audio data of a first account corresponding to the first terminal, and sending the audio data of the first account to the server, to trigger the server to send the audio data of the first account to second terminals corresponding to a plurality of second accounts in the live-streaming room.

According to another aspect of the embodiments of the present disclosure, a method for live streaming is provided. The method is performed by a server and includes: receiving an online tutorial request from a first account in a live-streaming room of an anchor account, and sending the online tutorial request to an anchor terminal corresponding to the anchor account, wherein the online tutorial request is configured to request the anchor account to provide an online tutorial for a target service; acquiring video data of the first account in response to approval of the anchor account for the online tutorial request, wherein the video data is acquired by recording a screen of a first terminal corresponding to the first account; sending the video data to second terminals corresponding to a plurality of second accounts in the live-streaming room; sending, in response to receiving audio data of the anchor account, the audio data of the anchor account to the second terminals; and sending, in response to receiving audio data of the first account, the audio data of the first account to the second terminals.

According to another aspect of the embodiments of the present disclosure, a method for live streaming is provided. The method is performed by an anchor terminal and includes: displaying, in response to an online tutorial request of a first account in a live-streaming room of an anchor account, a prompt message of the online tutorial request in the live-streaming room, wherein the online tutorial request is configured to request the anchor account to provide an online tutorial for a target service; sending an approval message to a server in response to detecting an approval operation on the prompt message, wherein the approval message is configured to indicate that the anchor account approves the online tutorial request; displaying, in response to receiving video data of the first account, a current screen of a first terminal corresponding to the first account based on the video data, wherein the video data is acquired by recording the screen of the first terminal; acquiring audio data of the anchor account and sending the audio data of the anchor account to the server, to trigger the server to send the audio data of the anchor account to second terminals corresponding to a plurality of second accounts in the live-streaming room; and playing, in response to receiving audio data of the first account, the audio data of the first account in the live-streaming room of the anchor account.

DETAILED DESCRIPTION

Data involved in the present disclosure is data authorized by a user or fully authorized by various parties.

Figure 1:
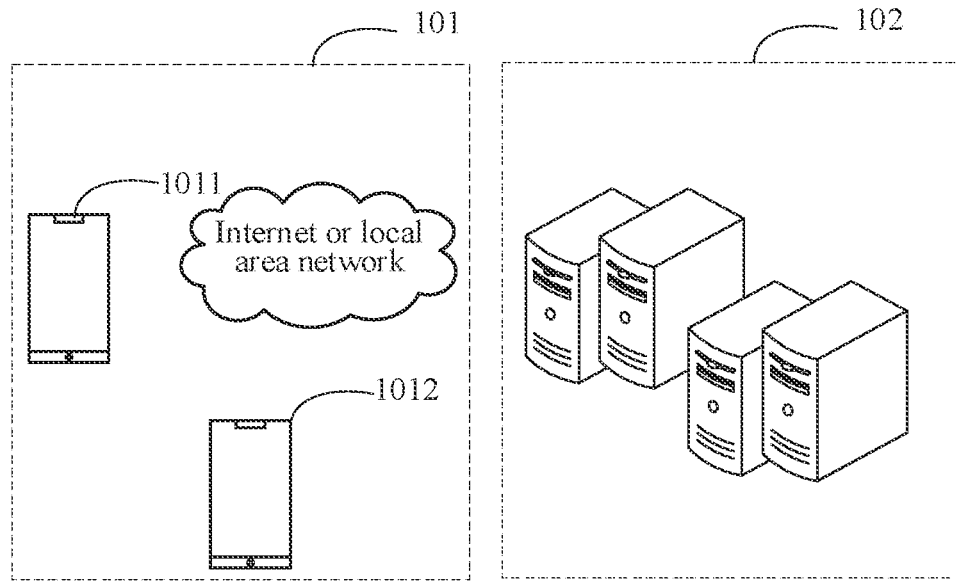
FIG. 1 shows a schematic diagram of an implementation environment of a method for live streaming according to an exemplary embodiment of the present disclosure.

FIG. 1 shows a schematic diagram of an implementation environment of a method for live streaming according to an exemplary embodiment of the present disclosure. Referring to FIG. 1, the implementation environment includes: a terminal 101 and a server 102.

In some embodiments, the terminal 101 is at least one of a smart mobile phone, a smart watch, a desktop computer, a portable computer, a virtual reality terminal, an augmented reality terminal, a wireless terminal, and a laptop portable computer. The terminal 101 has a communication function, and the terminal 101 generally refers to one of a plurality of terminals. The embodiments of the present disclosure only take the terminal 101 as an example for description. A person skilled in the art can understand that there may be more or less terminals. In some embodiments, the terminal 101 runs an application with a live-streaming function, and a user can perform video interaction or audio interaction with other users through the application with the live-streaming function.

In the embodiments of the present disclosure, the terminal 101 includes a first terminal 1011 and a second terminal 1012. The first terminal 1011 is a terminal corresponding to an anchor account, and the second terminal 1012 is a terminal corresponding to a viewer account, that is, a terminal corresponding to a user account that requests an online tutorial. A terminal corresponding to an account refers to a terminal to which the account is logged in. For example, the first terminal 1011 is a terminal to which the anchor account is logged in, and the second terminal 1012 is a terminal to which the viewer account is logged in. It should be noted that a first account is any viewer account in the live-streaming room of the anchor account. The online tutorial is an online tutorial provided by the anchor account to the first account for a specific service. For example, an online tutorial for a game provided by the anchor account to the first account, an online tutorial for learning provided by the anchor account to the first account, and the like. In the embodiments of the present disclosure, a target service is configured to represent a service for which the anchor account provides the online tutorial. In some embodiments, a second account is a viewer account other than the first account in the live-streaming room of the anchor account.

In some embodiments, the server 102 is an independent physical server, a server cluster consisting of a plurality of physical servers, a distributed file system, or a cloud server providing a cloud service, a cloud database, cloud computing, a cloud function, cloud storage, a network service, cloud communication, a middleware service, a domain name service, a security service, a content delivery network (CDN), or other basic cloud computing services such as big data and an artificial intelligence platform. The server 102 and the terminal 101 are connected directly or indirectly through wired or wireless communication, which is not limited in the embodiments of the present disclosure. In some embodiments, there may be more or less servers 102, which is not limited in the embodiments of the present disclosure. In some embodiments, the server 102 further includes other functional servers to provide more comprehensive and diversified services.

In the embodiments of the present disclosure, the server 102 is a backend server of the live-streaming application. After live-streaming data flows of the first terminal 1011 and the second terminal 1012 are received, the server 102 sends the live-streaming data flows to terminals corresponding to a plurality of accounts in the live-streaming room.

The method for live streaming provided in the embodiments of the present disclosure is jointly performed by the first terminal 1011, the second terminal 1012, and the server 102. The corresponding processes are as follows. An anchor operates on the first terminal 1011. The anchor logs on the anchor account in the live-streaming application, clicks a live-streaming startup button in a live-streaming application interface, and creates a live-streaming room of the anchor account. A user operates on the second terminal 1012. The user logs on the first account in the live-streaming application, and enters the live-streaming room of the anchor account by live-streaming room searching or live-streaming room recommendation. An online tutorial portal of the target service is displayed on an interface of the live-streaming room. In the case that the user wants to apply for an online tutorial from the anchor, the user operates on the second terminal 1012. The user clicks the online tutorial portal to trigger the second terminal 1012 to send an online tutorial request to the server 102. In response to receiving the online tutorial request, the server 102 sends the online tutorial request to the first terminal 1011. In the case that the anchor account approves the online tutorial request, the anchor can provide an online tutorial for the target service to the user by performing the methods for live streaming according to the embodiments of the present disclosure.

Figure 2:
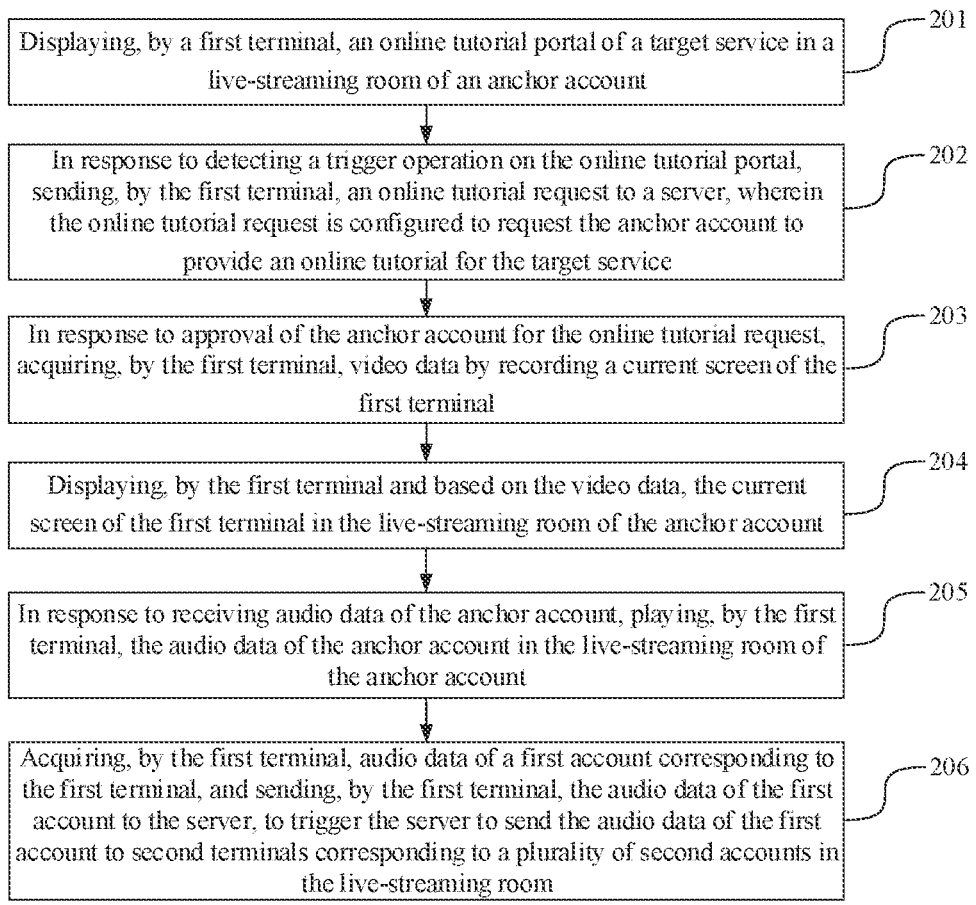
FIG. 2 is a flowchart of a method for live streaming according to an exemplary embodiment of the present disclosure.

FIG. 2 is a flowchart of a method for live streaming according to an exemplary embodiment of the present disclosure. As shown in FIG. 2, the method is performed by a first terminal, and the terminal is a terminal corresponding to a user account (first account) requesting an online tutorial, that is, the first terminal is the second terminal 1012 shown in FIG. 1. Exemplarily, the method includes the following processes.

In 201, the first terminal displays an online tutorial portal of a target service in a live-streaming room of an anchor account.

In 202, in response to detecting a trigger operation on the online tutorial portal, the first terminal sends an online tutorial request to a server, wherein the online tutorial request is configured to request the anchor account to provide an online tutorial for the target service.

In 203, in response to approval of the anchor account for the online tutorial request, the first terminal acquires video data by recording a current screen of the first terminal.

In 204, the first terminal displays, in the live-streaming room of the anchor account, the current screen of the first terminal based on the video data.

In 205, in response to receiving audio data of the anchor account, the first terminal plays the audio data of the anchor account in the live-streaming room of the anchor account.

In 206, the first terminal acquires audio data of a first account corresponding to the first terminal and sends the audio data of the first account to the server, to trigger the server to send the audio data of the first account to second terminals corresponding to a plurality of second accounts in the live-streaming room.

In the technical solutions provided in the embodiments of the present disclosure, by seeing the screen of the first terminal in the live-streaming room, the anchor can provide a targeted tutorial based on actual operations of the user, thereby helping the user learn better and improving the interaction between the anchor and the viewer.

In some embodiments, the method further includes: displaying a resource payment prompt message in the live-streaming room in response to the approval of the anchor account for the online tutorial request, wherein the resource payment prompt message is configured to indicate an amount of resources to be paid for initiating the online tutorial request; and acquiring the video data in response to detecting a payment success message based on the resource payment prompt message.

In some embodiments, the method further includes: displaying a live-streaming screen of the anchor account in the live-streaming room of the anchor account; switching a screen displayed in the live-streaming room to the live-streaming screen of the anchor account in response to an online tutorial end message, wherein the online tutorial end message is configured to indicate that the online tutorial for the target service is ended.

In some embodiments, the method further includes: displaying an online tutorial scoring panel in the live-streaming room in response to an online tutorial end message, wherein the online tutorial end message is configured to indicate that the online tutorial for the target service is ended, the online tutorial scoring panel is configured to acquire a score of a current online tutorial, and the online tutorial scoring panel includes a plurality of scoring options; and sending, in response to detecting a select operation on any of the plurality of scoring options, a score corresponding to the scoring option to the server.

In some embodiments, the method further includes: displaying a ranking of scores of the target service, wherein the ranking of scores includes scores of a plurality of anchor accounts corresponding to the target service.

Figure 3:
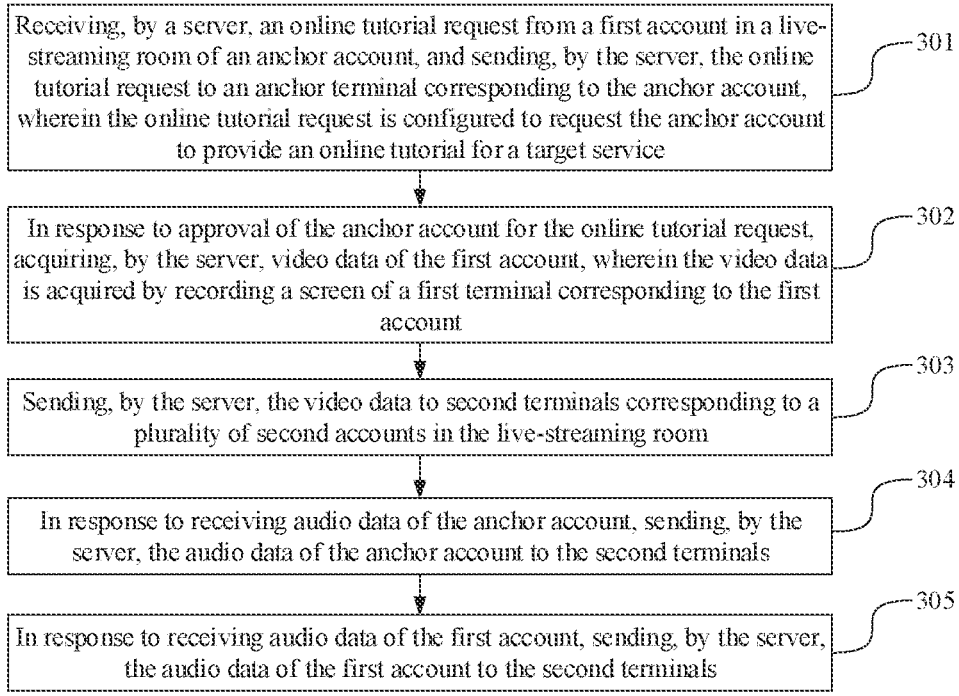
FIG. 3 is a flowchart of a method for live streaming according to an exemplary embodiment of the present disclosure.

FIG. 3 is a flowchart of a method for live streaming according to an exemplary embodiment of the present disclosure. As shown in FIG. 3, the method is performed by a server and includes the following processes.

In 301, the server receives an online tutorial request from a first account in a live-streaming room of an anchor account, and sends the online tutorial request to an anchor terminal corresponding to the anchor account, wherein the online tutorial request is configured to request the anchor account to provide an online tutorial for a target service. In the embodiment illustrated in FIG. 3, the first account is a viewer account in the live streaming room.

In 302, in response to approval of the anchor account for the online tutorial request, the server acquires video data of the first account, wherein the video data is acquired by recording a screen of a first terminal corresponding to the first account.

In 303, the server sends the video data to second terminals corresponding to a plurality of second accounts in the live-streaming room. The second terminals are the terminals corresponding to a plurality of viewer accounts in the live-streaming room, and the first terminal corresponding to the first account is not included in the second terminals.

In 304, in response to receiving audio data of the anchor account, the server sends the audio data of the anchor account to the second terminals.

In 305, in response to receiving audio data of the first account, the server sends the audio data of the first account to the second terminals.

In the technical solutions provided in the embodiments of the present disclosure, by seeing the screen of a user in the live-streaming room, the anchor can provide the targeted tutorial based on actual operations of the user, thereby helping the user and other users in the live-streaming room to learn better and improving the interaction between the anchor and the viewer.

In some embodiments, the method further includes: sending a resource payment prompt message to the first terminal in response to the approval of the anchor account for the online tutorial request, wherein the resource payment prompt message is configured to indicate an amount of resources to be paid for initiating the game online tutorial request.

In some embodiments, the method further includes: receiving a score of a current online tutorial from the first terminal or the terminals corresponding to the viewer accounts; and updating, based on the score, a ranking of scores to acquire an updated ranking of scores, wherein the ranking of scores includes scores of a plurality of anchor accounts corresponding to the target service.

Figure 4:
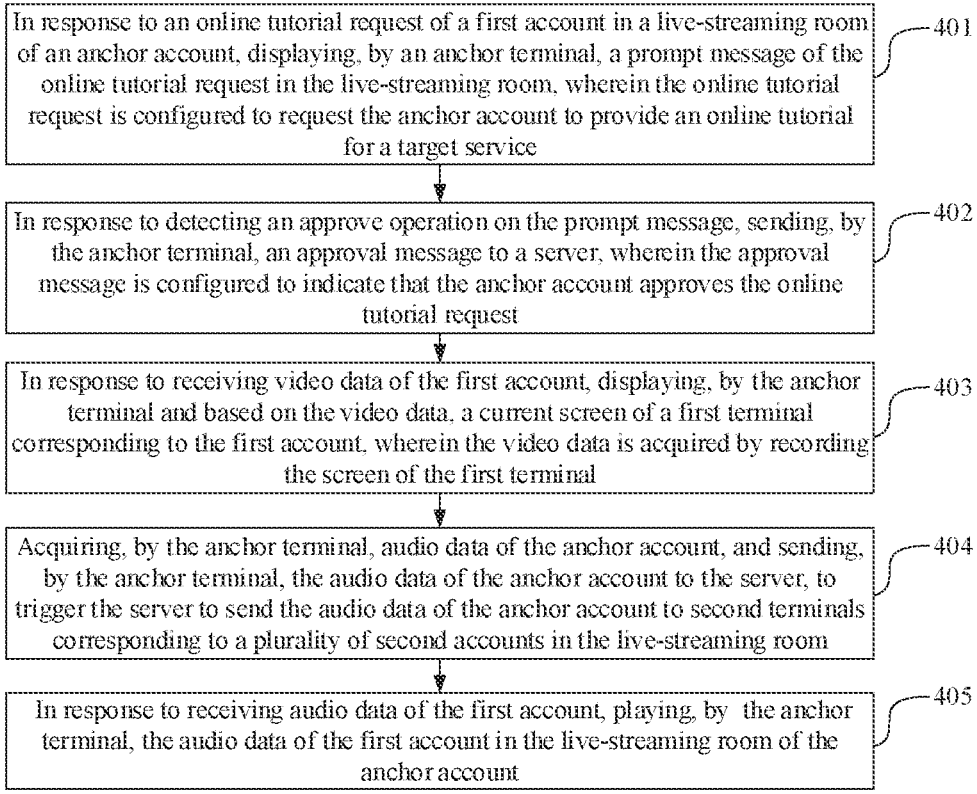
FIG. 4 is a flowchart of a method for live streaming according to an exemplary embodiment of the present disclosure.

FIG. 4 is a flowchart of a method for live streaming according to an exemplary embodiment of the present disclosure. As shown in FIG. 4, the method is performed by an anchor terminal, and the anchor terminal is a terminal corresponding to an anchor account, that is, the anchor terminal is the first terminal 1011 shown in FIG. 1. Exemplarily, the method includes the following processes.

In 401, in response to an online tutorial request of a first account in a live-streaming room of an anchor account, the anchor terminal displays a prompt message of the online tutorial request in the live-streaming room, wherein the online tutorial request is configured to request the anchor account to provide an online tutorial for a target service. The first account is a viewer account in the live-streaming room.

In 402, in response to detecting an approval operation on the prompt message, the anchor terminal sends an approval message to a server, wherein the approval message is configured to indicate that the anchor account approves the online tutorial request.

In 403, in response to receiving video data of the first account, the anchor terminal displays a current screen of a first terminal corresponding to the first account based on the video data, wherein the video data is acquired by recording the screen of the first terminal.

In 404, the anchor terminal acquires audio data of the anchor account and sends the audio data of the anchor account to the server, to trigger the server to send the audio data of the anchor account to second terminals corresponding to a plurality of second accounts in the live-streaming room. The second terminals are the terminals corresponding to a plurality of viewer accounts in the live-streaming room, and the first terminal corresponding to the first account is not included in the second terminals.

In 405, in response to receiving audio data of the first account, the anchor terminal plays the audio data of the first account in the live-streaming room of the anchor account.

In the technical solutions provided in the embodiments of the present disclosure, by seeing the screen of the first terminal of the user account, the anchor can provide the targeted tutorial based on actual operations of the user, thereby helping the user learn better and improving the interaction between the anchor and the viewer.

In some embodiments, the method further includes: displaying an online tutorial button in the live-streaming room of the anchor account, wherein the online tutorial button is configured to activate an online tutorial function; and sending an online tutorial function activation message to the server in response to detecting a trigger operation on the online tutorial button, wherein the online tutorial function activation message is configured to indicate that the online tutorial function has been activated.

In some embodiments, the method further includes: displaying a resource amount input box in the live-streaming room in response to detecting the trigger operation on the online tutorial button, wherein the resource amount input box is configured to input a resource amount required for the online tutorial; acquiring a resource amount in the resource amount input box in response to detecting an input complete operation on the resource amount input box; and sending an online tutorial function activation message carrying the resource amount to the server.

Figure 5:
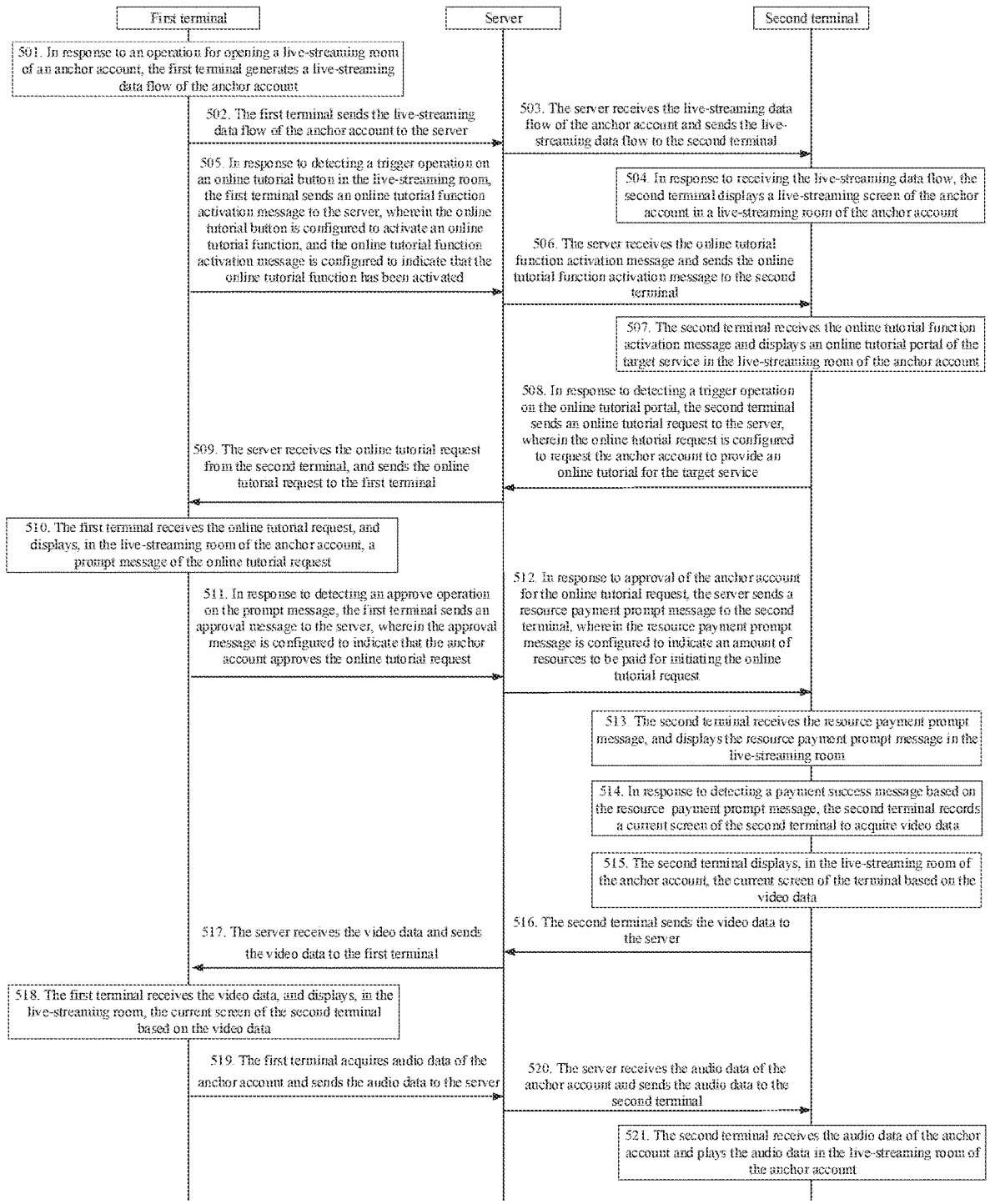
FIG. 5 is a flowchart of a method for live streaming according to an exemplary embodiment of the present disclosure.

FIG. 5 is a flowchart of a method for live streaming according to an exemplary embodiment of the present disclosure. In the embodiments, interaction processes of a first terminal, a second terminal, and a server is taken as an example to describe the technical solutions. Referring to FIG. 5, the method includes the following processes.

In 501, in response to an operation for opening a live-streaming room of an anchor account, the first terminal generates a live-streaming data flow of the anchor account.

The first terminal is configured to represent a terminal corresponding to the anchor account. That is, the first terminal is an anchor terminal. The live-streaming data flow includes a video data flow and an audio data flow.

In some embodiments, the anchor operates on the first terminal. The anchor activates the live-streaming application, and logs on the anchor account in the live-streaming application, wherein a live-streaming startup button is displayed in an interface of the live-streaming application. The anchor clicks the live-streaming startup button in the interface of the live-streaming application. Then, in response to the operation for opening a live-streaming room of the anchor account, the first terminal creates the live-streaming room of the anchor account, acquires video data and audio data of the anchor account, generates a live-streaming data flow of the anchor account by performing streaming media encoding on the video data and the audio data, and sends the live-streaming data flow to the server.

Based on different live-streaming content, live-streaming data flows generated by the first terminal are different. The process of generating the live-streaming data flow by the first terminal is described hereinafter.

In some embodiments, first video data of the anchor account is acquired through a camera of the first terminal, first audio data of the anchor account is acquired through a microphone of the first terminal, and a first live-streaming data flow of the anchor account is generated by performing streaming media encoding on the first video data and the first audio data. The first video data is image data acquired by the camera of the first terminal, such as a portrait image. The first audio data is audio data acquired by the microphone of the first terminal, such as a human voice. The camera of the first terminal is a built-in camera or an externally connected camera, and the microphone associated with the first terminal is a built-in microphone or an externally connected microphone. In these processes, the live-streaming data of the anchor account can be quickly acquired through the camera and microphone associated with the first terminal, such that fast flow pushing in the live-streaming room can be realized, thereby ensuring normal operation of the live-streaming room.

In other embodiments, the first terminal acquires second video data of the anchor account by recording a current screen of the first terminal, acquires second audio data generated by the first terminal based on the current screen, and generates a second live-streaming data flow of the anchor account by performing streaming media encoding on the second video data and the second audio data. The second video data is screen data of the first terminal, such as a game video screen. The second audio data is audio data generated by the first terminal, such as a game sound. In these processes, the live-streaming data of the anchor account is acquired by recording the screen, which can also acquire the live-streaming data of the anchor account quickly, such that fast flow pushing of the screen can be realized.

The two processes above are the process of generating the first live-streaming data flow based on the first video data and the first audio data, and the process of generating the second live-streaming data flow based on the second video data and the second audio data. It should be noted that, the first terminal can further generate a third live-streaming data flow based on the first video data, the first audio data, the second video data, and the second audio data. That is, the first terminal acquires the portrait image, the human voice, the screen, and the terminal sound, and generates the third live-streaming data flow by performing streaming media encoding on the portrait image, the human voice, the screen, and the terminal sound. For example, during game live streaming, the game anchor can do live streaming of game video screen and the portrait image of himself/herself at the same time. The process of generating the live-streaming data flow is not limited in the embodiments of the present disclosure.

In 502, the first terminal sends the live-streaming data flow of the anchor account to a server.

In 503, the server receives the live-streaming data flow of the anchor account and sends the live-streaming data flow to a second terminal.

In the embodiments of the present disclosure, the second terminal is a terminal corresponding to the first account. That is, the second terminal is a terminal corresponding to the user account requesting an online tutorial. It should be noted that, the second terminal is a terminal corresponding to any viewer account in the live-streaming room of the anchor account.

It should be understood that, the second terminal being an execution entity is merely taken as an example for illustrating the embodiments of the present disclosure. In practice, in response to receiving the live-streaming data flow of the anchor account, the server sends the live-streaming data flow to terminals corresponding to a plurality of viewer accounts in the live-streaming room. In response to receiving the live-streaming data flow, the terminals corresponding to the plurality of accounts display a live-streaming screen based on the live-streaming data flow. The second account is taken as an example, and the second account is any viewer account other than the first account in the live-streaming room of the anchor account. In response to receiving the live-streaming data flow of the anchor account, the server sends the live-streaming data flow to the terminal corresponding to the second account, to trigger the terminal corresponding to the second account to display the live-streaming screen of the live-streaming room.

In 504, in response to receiving the live-streaming data flow, the second terminal displays a live-streaming screen of the anchor account in a live-streaming room of the anchor account.

In some embodiments, in response to receiving the live-streaming data flow of the anchor account, the second terminal displays the live-streaming screen based on the live-streaming data flow of the anchor account.

Based on different live-streaming data flows generated in 501, live-streaming screens displayed on the second terminal are different. The processes of displaying the live-streaming screens based on the first live-streaming data flow, the second live-streaming data flow, and the third live-streaming data flow are described hereinafter.

In some embodiments, in a case that the second terminal receives the first live-streaming data flow of the anchor account, in the live-streaming room of the anchor account, displaying of a first video screen of the anchor account and playing of a first audio of the anchor account are performed at the same time. For example, displaying of the portrait image of the anchor account in the live-streaming room and playing of the human voice of the anchor account in the live-streaming room are performed at the same time.

In other embodiments, in a case that the second terminal receives the second live-streaming data flow of the anchor account, in the live-streaming room of the anchor account, displaying of a second video screen of the anchor account and playing of a second audio of the anchor account are performed at the same time. For example, displaying of a game video screen of the terminal corresponding to the anchor account in the live-streaming room and playing of a game audio of the anchor account in the live-streaming room are performed at the same time.

In other embodiments, in a case that the second terminal receives the third live-streaming data flow of the anchor account, in the live-streaming room of the anchor account, displaying of the first video screen and the second video screen of the anchor account and playing of the first audio and the second audio of the anchor account are performed at the same time. In some embodiments, the second terminal displays the second video screen of the anchor account in the form of a full screen, and displays the first video screen of the anchor account in the form of a window; or the second terminal displays the first video screen of the anchor account in the form of a full screen, and displays the second video screen of the anchor account in the form of a window. For example, in the live-streaming room, the game video screen of the anchor account is displayed in the form of a full screen and the portrait image of the anchor account is displayed in the form of a window; meanwhile, the game audio and the human voice of the anchor account are played.

In the foregoing embodiments, based on different live-streaming content of the anchor account, different live-streaming data flows are generated, and thus different live-streaming screens are displayed in the live-streaming room. The live-streaming screen displayed in the live-streaming room is not limited in the embodiments of the present disclosure.

In 505, in response to detecting a trigger operation on an online tutorial button in the live-streaming room, the first terminal sends an online tutorial function activation message to the server, wherein the online tutorial button is configured to activate an online tutorial function, and the online tutorial function activation message is configured to indicate that the online tutorial function has been activated.

In the embodiments of the present disclosure, the online tutorial is an online tutorial provided by the anchor account to the first account for a target service. The target service is configured to represent a service for which the anchor account provides the online tutorial. In some embodiments, the target service is a service of any type, such as a game service, a teaching service, or the like.

In some embodiments, the first terminal displays an online tutorial button in the live-streaming room of the anchor account, wherein the online tutorial button is configured to activate an online tutorial function. In a case that the anchor wants to activate the online tutorial function for the target service, the anchor clicks the online tutorial button in the interface of the live-streaming room. Then, in response to the activate operation of the anchor account on the online tutorial function, the first terminal sends an activation message to the server. In these processes, by configuring the online tutorial button, the anchor can acti-vate the online tutorial function by clicking the online tutorial button, thereby improving the human-computer interaction efficiency.

In other embodiments, in the case that the anchor wants to activate the online tutorial function for the target service, the anchor clicks the online tutorial button in the interface of the live-streaming room. Then, in response to detecting the trigger operation on the online tutorial button, the first terminal displays a resource amount input box in the live-streaming room, wherein the resource amount input box is configured to input a resource amount required for the online tutorial. The anchor operates on the first terminal. The anchor inputs a resource amount in the resource amount input box. Then, in response to detecting an input complete operation on the resource amount input box, the first terminal acquires the resource amount in the resource amount input box, generates an activation message carrying the resource amount, and sends the activation message to the server. The resource amount is an amount of money or virtual gold coins. For example, the target service is a game service, and the resource amount is 10 yuan, indicating that 10 yuan is required for each round of game. In these processes, by triggering the online tutorial button, the resource amount input box is displayed, such that the anchor can operate in the resource amount input box to determine the resource amount required for the online tutorial, thereby improving the human-computer interaction efficiency and the flexibility of interaction.

The foregoing processes are processes in which the anchor inputs the resource amount manually. In other embodiments, the resource amount can be predetermined by a technician, such that the anchor can acquire the resource amount corresponding to the online tutorial function in response to activating the online tutorial function.

In 506, the server receives the online tutorial function activation message and sends the online tutorial function activation message to the second terminal.

In some embodiments, in response to receiving the online tutorial function activation message, the server sends the online tutorial function activation message to the terminals corresponding to the plurality of accounts in the live-streaming room. Then, in response to receiving the online tutorial function activation message, the terminals corresponding to the plurality of accounts can display an online tutorial portal.

In 507, the second terminal receives the online tutorial function activation message and displays an online tutorial portal of the target service in the live-streaming room of the anchor account.

In some embodiments, in response to receiving the online tutorial function activation message, the second terminal acquires the resource amount carried in the online tutorial function activation message, and displays the online tutorial portal of the target service and the corresponding resource amount in the live-streaming room of the anchor account. For example, the online tutorial portal of the target service includes a prompt message, a name of the target service, and the resource amount. For example, the prompt message is "The anchor has activated the online tutorial", the name of the target service is "** game," and the resource amount is "RMB 10 yuan."

It should be noted that, processes 505 to 507 are optional. In other embodiments, the online tutorial portal of the target service is displayed in the live streaming room interface of the terminals corresponding to the plurality of viewer accounts in the live streaming room. The online tutorial portal can be displayed without triggering by the anchor.

In 508, in response to detecting a trigger operation on the online tutorial portal, the second terminal sends an online tutorial request to the server, wherein the online tutorial request is configured to request the anchor account to provide an online tutorial for the target service.

In some embodiments, in a case that the user wants to apply for the online tutorial provided by the anchor, the user clicks the online tutorial portal in the live-streaming room. Then, in response to detecting the click operation on the online tutorial portal, the second terminal sends the online tutorial request to the server, wherein the online tutorial request carries information of the first account. For example, the information of the first account is an account avatar, an account identification (ID), and the like.

In 509, the server receives the online tutorial request from the second terminal, and sends the online tutorial request to the first terminal.

In 510, the first terminal receives the online tutorial request, and displays, in the live-streaming room of the anchor account, a prompt message of the online tutorial request.

In some embodiments, in response to receiving the online tutorial request from the server, the first terminal acquires the information of the first account carried in the online tutorial request, and displays, in the live-streaming room of the anchor account, the prompt message of the online tutorial request. For example, the prompt message is displayed in the form of a prompt box for the online tutorial request, wherein the prompt box for the online tutorial request is configured to indicate the online tutorial request for the target service. For example, the prompt box for the online tutorial request includes the information of the first account, an approve button, and a reject button.

It should be understood that, in response to an online tutorial request from any account in the live-streaming room of the anchor account, the first terminal displays, in the live-streaming room, the prompt message of the online tutorial request.

In 511, in response to detecting an approval operation on the prompt message, the first terminal sends an approval message to the server, wherein the approval message is configured to indicate that the anchor account approves the online tutorial request.

In some embodiments, in a case that the anchor agrees to provide the online tutorial to the user, the anchor clicks the approve button in the prompt box for the online tutorial request. Then, in response to the approval of the anchor account for the online tutorial request, the first terminal sends the approval message to the server, to indicate that the anchor account approves the online tutorial request.

The 511 described above is a process in which the anchor account approves the online tutorial request. In other embodiments, in a case that the anchor refuses to provide the online tutorial to the user, the anchor clicks the reject button in the prompt box for the online tutorial request. Then, in response to the rejection of the anchor account for the online tutorial request, the first terminal sends a rejection message to the server, to indicate that the anchor account rejects the online tutorial request.

In 512, in response to approval of the anchor account for the online tutorial request, the server sends a resource payment prompt message to the second terminal, wherein the resource payment prompt message is configured to indicate an amount of resources to be paid for initiating the online tutorial request.

In some embodiments, the server receives the approval message sent by the first terminal, acquires the information of the first account carried in the approval message, and sends, based on the information of the first account, the resource payment prompt message to the terminal corresponding to the first account, that is, the second terminal, wherein the resource payment prompt message carries a resource amount.

In some embodiments, the approval message carries the resource amount. Then, in response to receiving the approval message, the server can acquire the resource amount carried in the approval message, and generate the resource payment prompt message based on the resource amount. Alternatively, in the case that the server receives the resource amount for the first time, that is, the server receives the online tutorial function activation message sent by the first terminal, the server acquires and records the resource amount carried in the online tutorial function activation message. Then, the server can acquire the resource amount corresponding to the anchor account by querying the recorded resource amount, and generate the resource payment prompt message based on the resource amount acquired by querying. The process of acquiring the resource amount by the server in 512 is not limited in embodiments of the present disclosure.

In 513, the second terminal receives the resource payment prompt message, and displays the resource payment prompt message in the live-streaming room.

In some embodiments, in response to receiving the resource payment prompt message sent by the server, the second terminal acquires the resource amount carried in the resource payment prompt message, and displays the resource payment prompt message in the live-streaming room of the anchor account, wherein the resource payment prompt message includes a pay button and a cancel button.

It should be understood that the resource payment prompt message in processes 512 to 513 is sent by the server to the second terminal only, and is not sent to other viewer accounts in the live-streaming room. That is, only the second terminal displays the resource payment prompt message, and the terminals corresponding to other viewer accounts in the live-streaming room do not display the resource payment prompt message.

In 514, in response to detecting a payment success message based on the resource payment prompt message, the second terminal records a current screen of the second terminal to acquire video data.

In some embodiments, the user clicks the pay button in the resource payment prompt message. In this case, in response to the pay operation of the user, the second terminal pulls up a third-party payment platform to run a payment process. After the user completes the payment, the second terminal acquires, in response to detecting the payment success message based on the resource payment prompt message, the video data by recording the current screen of the second terminal, such that the flow pushing to the server can be performed.

In the foregoing processes, by displaying the resource payment prompt message, the amount of information displayed in the live-streaming room is increased, such that the user can conveniently trigger, based on the resource payment prompt message, the terminal to acquire the video data.

The target service being a game service is taken as an example. The screen recorded by the second terminal includes a game video screen. In some embodiments, in the case that the anchor approves the online tutorial request, the user operates on the second terminal to activate a game application. Then, in response to the activate operation for the game application, the second terminal displays an interface of the game application. Correspondingly, the screen recorded by the second terminal includes the interface of the game application. In other embodiments, in response to the approval of the anchor for the online tutorial request, the second terminal automatically activates the game application and displays the interface of the game application. Correspondingly, the screen recorded by the second terminal includes the interface of the game application. In this way, the game application can be manually activated by the user or automatically activated by the second terminal, and fast activation of the game application can be realized. Then, the second terminal can record the game video screen of the user and display the game video screen in the live-streaming room, and an online tutorial for the game can be performed subsequently.

In 515, the second terminal displays, in the live-streaming room of the anchor account, the current screen of the second terminal based on the video data.

In some embodiments, in response to acquiring the video data, the second terminal can display, in the live-streaming room of the anchor account, the current screen of the second terminal based on the video data, without waiting for the flow pushed by the server.

In 516, the second terminal sends the video data to the server.

In some embodiments, the second terminal sends the video data to the server in the form of a data flow.

It should be noted that, there is no strict sequence between processes 515 and 516. That is, after the video data is acquired, the second terminal can send the video data to the server and display the screen in the live-streaming room at the same time.

In 517, the server receives the video data and sends the video data to the first terminal.

The 517 is a process of sending the video data to the terminal corresponding to the anchor account (that is, the first terminal), such that the anchor account can see the screen of the second terminal in real time, that is, the anchor account can see operations of the first account on the screen in real time, thereby facilitating the subsequent online tutorial. In some embodiments, in response to receiving the video data, the server sends the video data to the terminals corresponding to the plurality of accounts in the live-streaming room. Then, in response to receiving the video data, the terminals corresponding to the plurality of accounts in the live-streaming room display the screen of the second terminal. The second account is taken as an example. In response to receiving the video data, the server sends the video data to the terminal corresponding to the second account, to trigger the terminal corresponding to the second account to display the screen of the second terminal. As described in association with 503, the second account is any viewer account other than the first account in the live-streaming room of the anchor account. In this way, other viewer accounts in the live-streaming room can also see the screen of the second terminal corresponding to the first account of a user.

In 518, the first terminal receives the video data, and displays, in the live-streaming room, the current screen of the second terminal based on the video data.

In some embodiments, after the server sends the video data to the terminals corresponding to the plurality of accounts in the live-streaming room, the first terminal can receive the video data, and display, in the live-streaming room, the current screen of the second terminal based on the video data.

In 519, the first terminal acquires audio data of the anchor account and sends the audio data to the server.

In some embodiments, after the current screen of the second terminal is displayed in the live-streaming room of the first terminal, the anchor can see the screen of the second terminal in real time. In this case, the user operates on the second terminal to display a screen corresponding to the target service. Through a voice communication, the anchor can provide a tutorial for the target service to the user. That is, the anchor clicks a voice call button in the live-streaming room. Then, in response to the voice call operation of the anchor account, the first terminal sends a voice call request to the server. In response to approval of the first account for the voice call request, the anchor and the user start a voice communication. The first terminal acquires the audio data of the anchor account through the microphone, and sends the audio data of the anchor account to the server, to push the flow of the audio data of the anchor account.

In 520, the server receives the audio data of the anchor account and sends the audio data to the second terminal.

The 520 is a process of sending the audio data of the anchor account to the second terminal. In some embodiments, in response to receiving the audio data of the anchor account, the server sends the audio data of the anchor account to the terminals corresponding to the plurality of accounts in the live-streaming room. Then, in response to receiving the audio data of the anchor account, the terminals corresponding to the plurality of accounts in the live-streaming room play the audio data. The second account is taken as an example. In response to receiving the audio data of the anchor account, the server sends the audio data of the anchor account to the terminal corresponding to the second account, to trigger the terminal corresponding to the second account to play the audio data of the anchor account. In this way, other viewer accounts in the live-streaming room can also acquire content of the online tutorial provided by the anchor account.

For example, the target service is a game service. The screen of the second terminal is a game video screen of the game application; meanwhile, the game video screen is also displayed in the live-streaming room. When the user plays the game, all of the anchor account and other viewer accounts in the live-streaming room can watch the game process of the user. The anchor provides an online tutorial for the game process of the user through a voice communication. In this case, the audio of the live-streaming room includes a microphone sound of the first terminal (i.e., audio of the anchor), a microphone sound of the second terminal (i.e., audio of the user), and a device sound of the second terminal (i.e., game sound).

In 521, the second terminal receives the audio data of the anchor account and plays the audio data in the live-streaming room of the anchor account.

Processes 519 to 521 is a process of pushing the flow of the audio data of the anchor account. In other embodiments, when the user operating the second terminal speaks, the second terminal acquires audio data of the user through the microphone, and sends the audio data of the user to the server. Then, in response to receiving the audio data of the user, the server sends the audio data of the user to the terminals corresponding to the plurality of terminals in the live-streaming room, to push the flow of the audio data of the user.

In other embodiments, in response to an online tutorial end message, the second terminal switches the screen displayed in the live-streaming room to the live-streaming screen of the anchor account, wherein the online tutorial end message is configured to indicate that the online tutorial for the target service is ended. The online tutorial end message is triggered by the user operating the second terminal or triggered by the anchor. It should be noted that, in response to the online tutorial end message, the terminals corresponding to other viewer accounts in the live-streaming room and the first terminal also switches the screen displayed in the live-streaming room to the live-streaming screen of the anchor account. In this way, after the online tutorial is ended, the image of the live-streaming room is switched from the current screen of the terminal to the live-streaming screen of the anchor account automatically, such that the anchor or the user does not need to switch the image, thereby improving the human-computer interaction efficiency.

In the technical solutions provided in the embodiments of the present disclosure, by seeing the screen of a user, the anchor can provide a targeted tutorial based on actual operations of the user, thereby helping the user learn better and improving the interaction between the anchor and the viewer.

Figure 6:
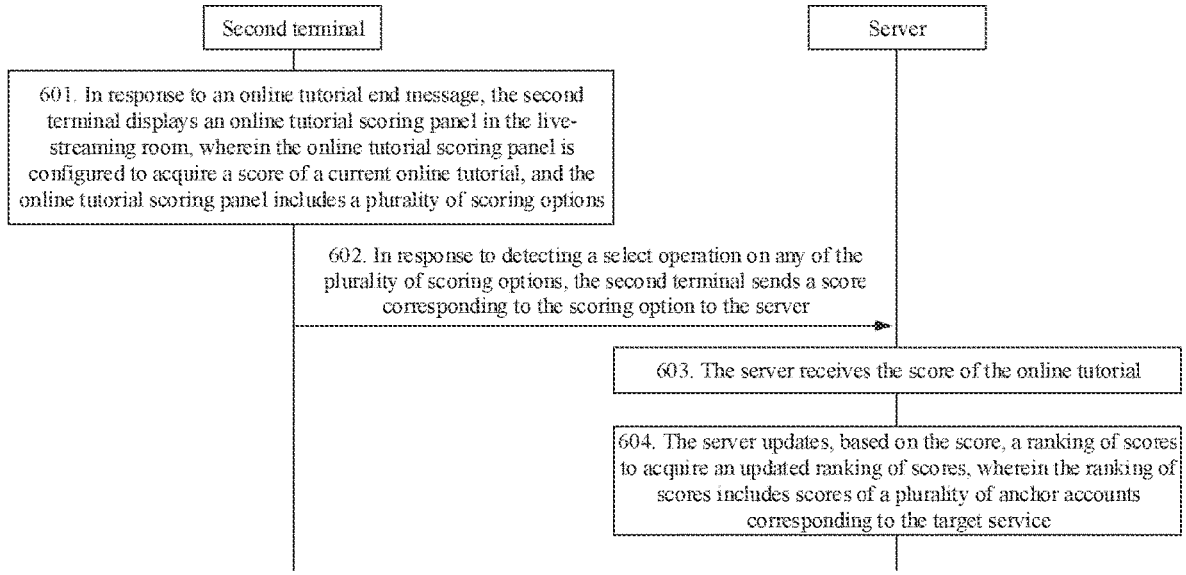
FIG. 6 is a flowchart of a method for live streaming according to an exemplary embodiment of the present disclosure.

FIG. 5 illustrates the live-streaming process of the online tutorial. In other embodiments, after the online tutorial is ended, the user can further rate the online tutorial. FIG. 6 is a flowchart of a method for live streaming according to an exemplary embodiment of the present disclosure. An interaction process between the second terminal and the server is taken as an example in the embodiment. Referring to FIG. 6, the method includes the following processes.

In 601, in response to an online tutorial end message, the second terminal displays an online tutorial scoring panel in the live-streaming room, wherein the online tutorial scoring panel is configured to acquire a score of a current online tutorial, and the online tutorial scoring panel includes a plurality of scoring options.

In some embodiments, in response to the online tutorial end message, the second terminal displays the online tutorial scoring panel in the live-streaming room, wherein the online tutorial scoring panel includes information of the anchor account and the plurality of scoring options. For example, an anchor avatar or anchor ID of the anchor account, a scoring option "excellent", a scoring option "good", a scoring option "average" and a scoring option "poor" are displayed in the live-streaming room. In this case, the user operating the second terminal clicks or taps a corresponding scoring option to acquire the score of the current online tutorial of the anchor.

In other embodiments, in response to the online tutorial end message, the second terminal displays an online tutorial scoring panel in the live-streaming room, wherein the online tutorial scoring panel includes information of the anchor account and a score input box, wherein the score input box is configured to input a score of the current online tutorial. In this case, the user operating the second terminal inputs a score within a predetermined range into the score input box, such as 50, to acquire the score of the current online tutorial of the anchor. The predetermined range refers to a scoring range predetermined by the technician, e.g., 0 to 100 (points). In the foregoing processes, the technical solution is illustrated by using the scoring option and the score input box as examples respectively. The score may also be displayed in other manners. The process of displaying the score is not limited in the embodiments of the present disclosure.

In 602, in response to detecting a select operation on any of the plurality of scoring options, the second terminal sends a score corresponding to the scoring option to the server.

In some embodiments, in response to detecting the select operation on any of the plurality of scoring options, the second terminal acquires the score corresponding to the scoring option based on an option identifier of the scoring option and a corresponding relationship between option identifiers and scores, and sends the score corresponding to the scoring option to the server.

In other embodiments, in response to detecting an input completion message for the score input box, the second terminal acquires the score in the score input box, and sends the score to the server.

In the foregoing embodiments, by displaying the online tutorial scoring panel, the user can rate the online tutorial of the anchor account through the online tutorial scoring panel, thereby improving the human-computer interaction efficiency.

In 603, the server receives the score of the online tutorial.

In 604, the server updates, based on the score, a ranking of scores to acquire an updated ranking of scores, wherein the ranking of scores includes scores of a plurality of anchor accounts corresponding to the target service.

In some embodiments, the second terminal can further display the ranking of scores of the target service, wherein the ranking of scores includes the scores of the plurality of anchor accounts corresponding to the target service. For example, in response to a ranking list view request of the user, the second terminal displays the ranking of scores of the target service in the live-streaming room or on the interface of the live-streaming application. Then, the user can select, based on the ranking of scores, an anchor with a high score to provide a tutorial. In addition, the server can further maintain rankings of scores of different services. In response to receiving the score, the server stores the score of the user, and displays, based on different services, the corresponding rankings of scores.

In the embodiments of the present disclosure, by setting the ranking of scores, the amount of displayed information is increases, such that the user can acquire the online tutorial score of each anchor account in real time, and quickly determine an anchor account with a high online tutorial score.

Figure 7:
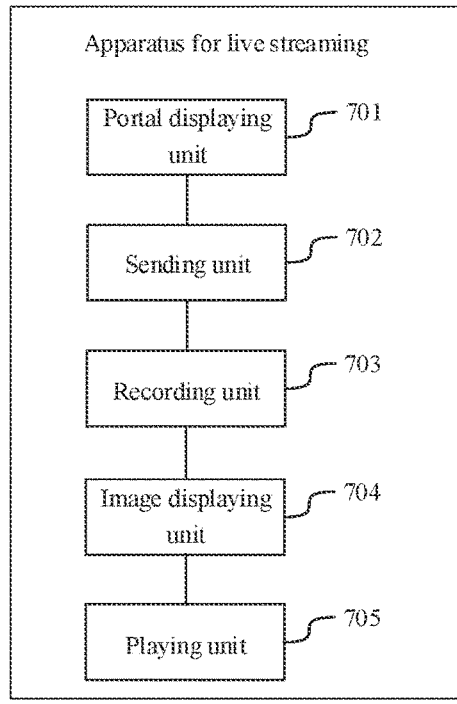
FIG. 7 is a block diagram of an apparatus for live streaming according to an exemplary embodiment of the present disclosure.

FIG. 7 is a block diagram of an apparatus for live streaming according to an exemplary embodiment of the present disclosure. The apparatus is applied to a first terminal. Referring to FIG. 7, the apparatus includes a portal displaying unit 701, a sending unit 702, a recording unit 703, an image displaying unit 704, and a playing unit 705.

The portal displaying unit 701 is configured to display an online tutorial portal of a target service in a live-streaming room of an anchor account.

The sending unit 702 is configured to send an online tutorial request to a server in response to detecting a trigger operation on the online tutorial portal, wherein the online tutorial request is configured to request the anchor account to provide an online tutorial for the target service.

The recording unit 703 is configured to acquire video data by recording a current screen of the first terminal in response to approval of the anchor account for the online tutorial request.

The image displaying unit 704 is configured to display, in the live-streaming room of the anchor account, the current screen of the first terminal based on the video data.

The playing unit 705 is configured to play, in response to receiving audio data of the anchor account, the audio data of the anchor account in the live-streaming room of the anchor account.

The sending unit 702 is further configured to acquire audio data of a first account corresponding to the first terminal, and send the audio data of the first account to the server, to trigger the server to send the audio data of the first account to second terminals corresponding to a plurality of second accounts in the live-streaming room.

In some embodiments, the apparatus further includes a message displaying unit. The message displaying unit is configured to display a resource payment prompt message in the live-streaming room in response to the approval of the anchor account for the online tutorial request, wherein the resource payment prompt message is configured to indicate an amount of resources to be paid for initiating the online tutorial request. The recording unit 703 is further configured to acquire the video data in response to detecting a payment success message based on the resource payment prompt message.

In some embodiments, the image displaying unit 704 is further configured to display a live-streaming screen of the anchor account in the live-streaming room of the anchor account. The apparatus further includes a switching unit. The switching unit is configured to switch a screen displayed in the live-streaming room to the live-streaming screen of the anchor account in response to an online tutorial end message, wherein the online tutorial end message is configured to indicate that the online tutorial for the target service is ended.

In some embodiments, the apparatus further includes a panel displaying unit. The panel displaying unit is configured to display an online tutorial scoring panel in the live-streaming room in response to an online tutorial end message, wherein the online tutorial end message is configured to indicate that the online tutorial for the target service is ended, the online tutorial scoring panel is configured to acquire a score of a current online tutorial, and the online tutorial scoring panel includes a plurality of scoring options. The sending unit 702 is further configured to send, in response to detecting a select operation on any of the plurality of scoring options, a score corresponding to the scoring option to the server.

In some embodiments, the apparatus further includes a ranking list displaying unit. The ranking list displaying unit is configured to display a ranking of scores of the target service, wherein the ranking of scores includes scores of a plurality of anchor accounts corresponding to the target service.

In the technical solutions provided in the embodiments of the present disclosure, by seeing the screen, the anchor can provide a targeted tutorial based on actual operations of the user, thereby helping the user learn better and improving the interaction between the anchor and the viewer.

Figure 8:
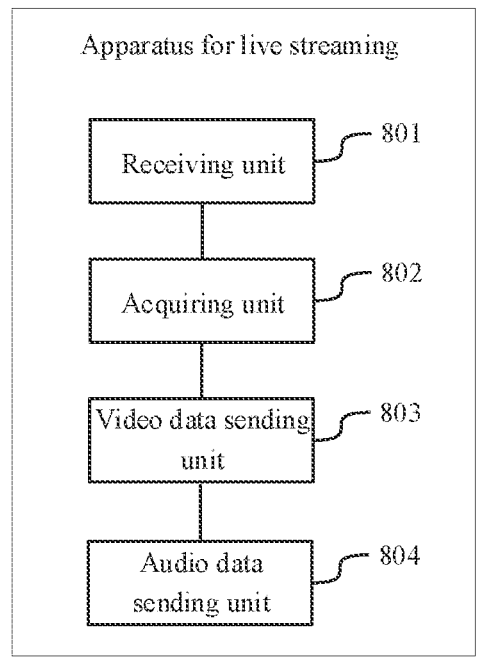
FIG. 8 is a block diagram of an apparatus for live streaming according to an exemplary embodiment of the present disclosure.

FIG. 8 is a block diagram of an apparatus for live streaming according to an exemplary embodiment of the present disclosure. The apparatus is applied to a server. Referring to FIG. 8, the apparatus includes a receiving unit 801, an acquiring unit 802, a video data sending unit 803, and an audio data sending unit 804.

The receiving unit 801 is configured to receive an online tutorial request from a first account in a live-streaming room of an anchor account, and send the online tutorial request to an anchor terminal corresponding to the anchor account, wherein the online tutorial request is configured to request the anchor account to provide an online tutorial for a target service.

The acquiring unit 802 is configured to acquire video data of the first account in response to approval of the anchor account for the online tutorial request, wherein the video data is acquired by recording a screen of a first terminal corresponding to the first account.

The video data sending unit 803 is configured to send the video data to second terminals corresponding to a plurality of second accounts in the live-streaming room.

The audio data sending unit 804 is configured to send, in response to receiving audio data of the anchor account, the audio data of the anchor account to the second terminals.

The audio data sending unit 804 is further configured to send, in response to receiving audio data of the first account, the audio data of the first account to the second terminals.

In some embodiments, the apparatus further includes a message sending unit, wherein the message sending unit is configured to send a resource payment prompt message to the first terminal in response to the approval of the anchor account for the online tutorial request, wherein the resource payment prompt message is configured to indicate an amount of resources to be paid for initiating the online tutorial request.

In some embodiments, the receiving unit 801 is further configured to receive a score of a current online tutorial. The apparatus further includes an updating unit, wherein the updating unit is configured to update, based on the score, a ranking of scores to acquire an updated ranking of scores, wherein the ranking of scores includes scores of a plurality of anchor accounts corresponding to the target service.

In the technical solutions provided in the embodiments of the present disclosure, by seeing the screen, the anchor can provide a targeted tutorial based on actual operations of the user, thereby helping the user learn better and improving the interaction between the anchor and the viewer.

Figure 9:
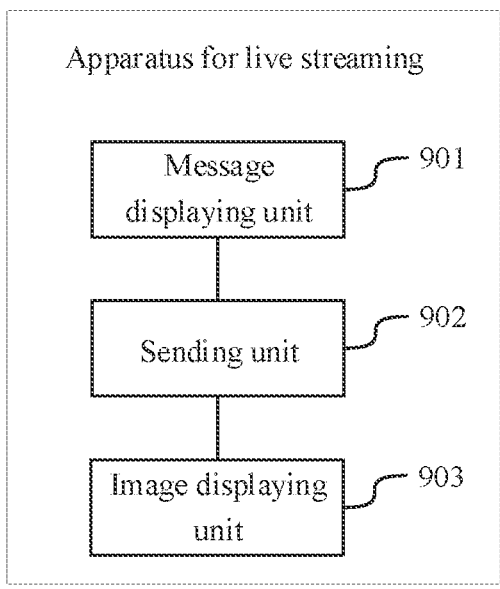
FIG. 9 is a block diagram of an apparatus for live streaming according to an exemplary embodiment of the present disclosure.

FIG. 9 is a block diagram of an apparatus for live streaming according to an exemplary embodiment of the present disclosure. The apparatus is applied to an anchor terminal. Referring to FIG. 9, the apparatus includes a message displaying unit 901, a sending unit 902, and an image displaying unit 903.

The message displaying unit 901 is configured to display, in response to an online tutorial request of a first account in a live-streaming room of an anchor account, a prompt message of the online tutorial request in the live-streaming room, wherein the online tutorial request is configured to request the anchor account to provide an online tutorial for a target service.

The sending unit 902 is configured to send an approval message to a server in response to detecting an approval operation on the prompt message, wherein the approval message is configured to indicate that the anchor account approves the online tutorial request.

The image displaying unit 903 is configured to display, in response to receiving video data of the first account, a current screen of a first terminal corresponding to the first account based on the video data, wherein the video data is acquired by recording the screen of the first terminal.

The sending unit 902 is further configured to acquire audio data of the anchor account and send the audio data of the anchor account to the server, to trigger the server to send the audio data of the anchor account to second terminals corresponding to a plurality of second accounts in the live-streaming room.

The apparatus is further configured to play, in response to receiving audio data of the first account, the audio data of the first account in the live-streaming room of the anchor account.

In some embodiments, the apparatus further includes a button displaying unit. The button displaying unit is configured to display an online tutorial button in the live-streaming room of the anchor account, wherein the online tutorial button is configured to activate an online tutorial function. The sending unit 902 is further configured to send an online tutorial function activation message to the server in response to detecting a trigger operation on the online tutorial button, wherein the online tutorial function activation message is configured to indicate that the online tutorial function has been activated.

In some embodiments, the apparatus further includes an input box displaying unit and an acquiring unit. The input box displaying unit is configured to display a resource amount input box in the live-streaming room in response to detecting the trigger operation on the online tutorial button, wherein the resource amount input box is configured to input a resource amount required for the online tutorial. The acquiring unit is configured to acquire the resource amount in the resource amount input box in response to detecting an input complete operation on the resource amount input box. The sending unit 902 is further configured to send an online tutorial function activation message carrying the resource amount to the server.

In the technical solutions provided in the embodiments of the present disclosure, by seeing the screen, the anchor can provide a targeted tutorial based on actual operations of the user, thereby helping the user learn better and improving the interaction between the anchor and the viewer.

Figure 10:
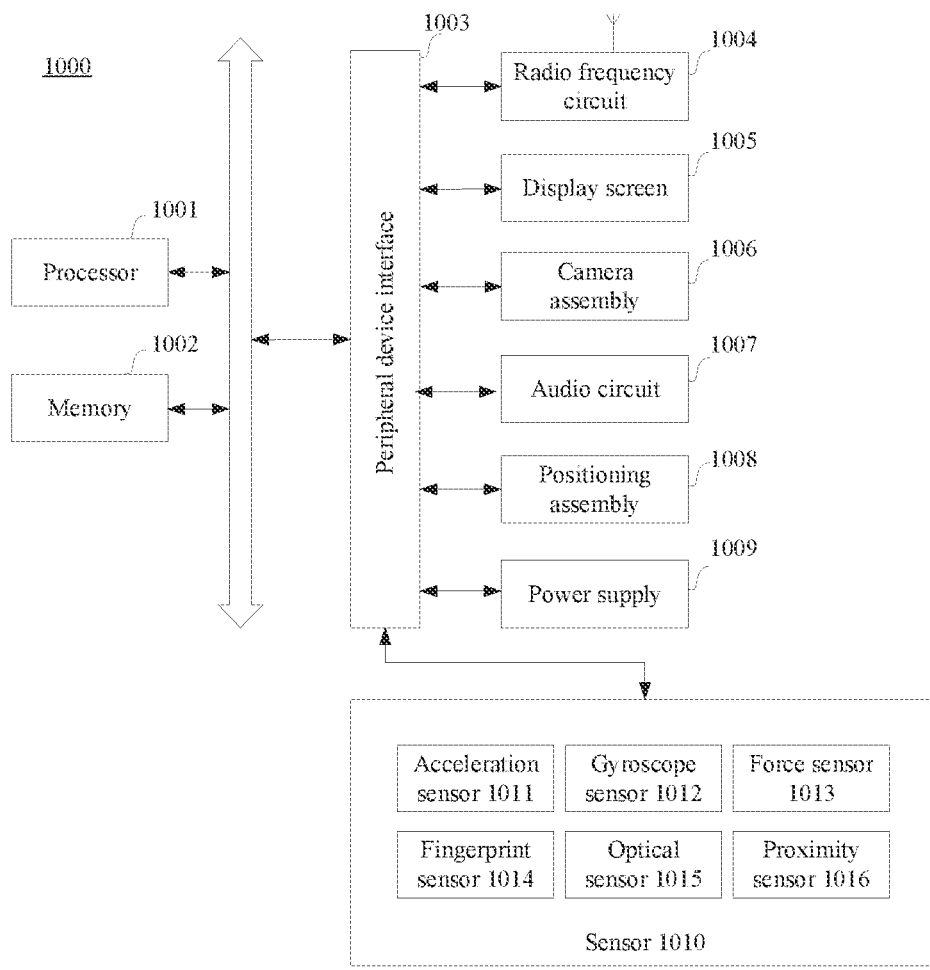
FIG. 10 is a block diagram of a terminal according to an exemplary embodiment of the present disclosure.

FIG. 10 is a block diagram of a terminal 1000 according to an exemplary embodiment of the present disclosure. In some embodiments, the terminal 1000 may be a smart mobile phone, a tablet computer, a Moving Picture Experts Group Audio Layer III (MP3) player, a Moving Picture Experts Group Audio Layer IV (MP4) player, a laptop computer, or a desktop computer. The terminal 1000 may also be referred to as a user equipment, a portable terminal, a laptop terminal, or a desktop terminal.

Generally, the terminal 1000 includes a processor 1001 and a memory 1002.

In some embodiments, the processor 1001 includes one or more processing cores, such as a quad-core processor or an eight-core processor. The processor 1001 is implemented in at least one hardware form of a digital signal processor (DSP), a field-programmable gate array (FPGA), and a programmable logic array (PLA). In some embodiments, the processor 1001 further includes a main processor and a coprocessor. The main processor is a processor configured to process data in an awake state, and is also referred to as a central processing unit (CPU). The coprocessor is a low-power-consumption processor configured to process data in a standby state. In some embodiments, the processor 1001 is integrated with a graphics processing unit (GPU). The GPU is configured to render and draw content that needs to be displayed by a display screen. In some embodiments, the processor 1001 further includes an Artificial Intelligence (AI) processor. The AI processor is configured to process computational operations related to machine learning.

In some embodiments, the memory 1002 includes one or more computer-readable storage medium. The computer-readable storage medium is non-transitory, or the computer-readable storage medium is of another type, which is not limited in the embodiments of the present disclosure. In some embodiments, the memory 1002 further includes a high-speed random-access memory and a non-volatile memory such as one or more magnetic disk storage devices and flash storage devices. In some embodiments, the non-transitory computer-readable storage medium in the memory 1002 is configured to store at least one instruction. The at least one instruction is configured to be executed by the processor 1001 to perform the processes that the first terminal or second terminal performing in the method for live streaming provided in the method embodiments of the present disclosure.

In some embodiments, the terminal 1000 further includes a peripheral device interface 1003 and at least one peripheral device. The processor 1001, the memory 1002, and the peripheral device interface 1003 may be connected by a bus or a signal cable. Each peripheral device may be connected to the peripheral device interface 1003 by a bus, a signal line, or a circuit board. In some embodiments, the peripheral device includes at least one of: a radio frequency circuit 1004, a display screen 1005, a camera assembly 1006, an audio circuit 1007, a positioning assembly 1008, and a power supply 1009.

The peripheral device interface 1003 may be configured to connect at least one peripheral device associated with an input/output (I/O) to the processor 1001 and the memory 1002. In some embodiments, the processor 1001, the memory 1002, and the peripheral device interface 1003 are integrated on the same chip or circuit board. In some other embodiments, any one or two of the processor 1001, the memory 1002 and the peripheral device interface 1003 may be implemented on an independent chip or circuit board, which is not limited in the embodiments of the present disclosure.

The radio frequency circuit 1004 is configured to receive and transmit a radio frequency (RF) signal, also referred to as an electromagnetic signal. The radio frequency circuit 1004 communicates with a communication network and other communication devices via the electromagnetic signal. The radio frequency circuit 1004 converts an electrical signal to the electromagnetic signal for transmission, or converts the electromagnetic signal to the electrical signal. Optionally, the radio frequency circuit 1004 includes: an antenna system, an RF transceiver, one or more amplifiers, a tuner, an oscillator, a digital signal processor, a coder/decoder (codec) chipset, a subscriber identity module card, and the like. The radio frequency circuit 1004 communicates with other terminals in accordance with at least one wireless communication protocol. The wireless communication protocol includes, but is not limited to, a metropolitan area network (MAN), various generations of mobile communication networks (2G, 3G, 4G, and 5G), a wireless local area network (LAN) and/or a wireless fidelity (Wi-Fi) network. In some embodiments, the radio frequency circuit 1004 further includes a circuit related to near field communication (NFC), which is not limited in the present disclosure.

The display screen 1005 is configured to display a user interface (UI). In some embodiments, the UI includes a graph, a text, an icon, a video, and any combination thereof. In the case that the display screen 1005 is a touch display screen, the display screen 1005 further has a function of acquiring a touch signal on or over a surface of the display screen 1005. In some embodiments, the touch signal may be input as a control signal to the processor 1001 for processing. In this case, the display screen 1005 is further configured to provide a virtual button and/or a virtual keyboard, which is also referred to as a soft button and/or a soft keyboard. In some embodiments, the display screen 1005 is provided as one screen disposed on a front panel of the terminal 1000. In some other embodiments, the display screen 1005 is provided as at least two screens disposed respectively on different surfaces of the terminal 1000 or design as folded. In still other embodiments, the display screen 1005 is a flexible display screen disposed on a curved surface or a folded surface of the terminal 1000. Furthermore, the display screen 1005 is provided as a non-rectangular pattern, namely, an irregular-shaped screen. In some embodiments, the display screen 1005 is a liquid crystal display (LCD), an organic light-emitting diode (OLED) screen, or the like.

The camera assembly 1006 is configured to acquire an image or a video. In some embodiments, the camera assembly 1006 includes a front camera and a rear camera. Generally, the front camera is disposed on a front panel of the terminal, and the rear camera is disposed on a rear surface of the terminal. In some embodiments, there are at least two rear cameras, which are respectively any one of a main camera, a depth-of-field camera, a wide-angle camera, and a telephoto camera, to implement a background blur function by combining of the main camera and the depth-of-field camera, and a panoramic shooting function and a virtual reality (VR) shooting function by combining of the main camera and the wide-angle camera, or other fusion shooting functions. In some embodiments, the camera assembly 1006 further includes a flashlight. For example, the flashlight is a single-color-temperature flashlight, or a dual-color-temperature flashlight. The dual-color-temperature flashlight is a combination of a warm flashlight and a cold flashlight, and can provide light compensation under different color temperatures.

The audio circuit 1007 includes a microphone and a speaker. The microphone is configured to acquire sound waves of a user and an environment, and convert the sound waves into electrical signals and input the electrical signals into the processor 1001 for processing, or input the electrical signals into the radio frequency circuit 1004 to implement voice communication. In some embodiments, for the purpose of stereo acquisition or noise reduction, a plurality of microphones is provided and respectively disposed at different parts of the terminal 1000. In some embodiments, the microphone is an array microphone or an omnidirectional acquisition microphone. The speaker is configured to convert electrical signals from the processor 1001 or the radio frequency circuit 1004 into sound waves. For example, the speaker is a conventional film speaker or a piezoelectric ceramic speaker. In the case that the speaker is the piezoelectric ceramic speaker, electrical signals can be converted into not only human-audible sound waves, but also the sound waves which are inaudible to human for the purpose of ranging and the like. In some embodiments, the audio circuit 1007 further includes a headphone jack.

The positioning assembly 1008 is configured to determine a current geographic location of the terminal 1000, to implement a navigation or a location based service (LBS). In some embodiments, the positioning assembly 1008 is a positioning assembly based on the United States' Global Positioning System (GPS), China's BeiDou Navigation Satellite System, Russia's Global Navigation Satellite System (GLONASS), or the European Union's Galileo Satellite Navigation System (Galileo).

The power supply 1009 is configured to supply power for various assemblies in the terminal 1000. In some embodiments, the power supply 1009 is alternating current, direct current, a disposable battery, or a rechargeable battery. In the case that the power supply 1009 includes the rechargeable battery, the rechargeable battery can be charged in a wired mode or a wireless mode. Further, the rechargeable battery can also support the fast-charging technology.

In some embodiments, the terminal 1000 further includes one or more sensors 1010. The one or more sensors 1010 include, but are not limited to: an acceleration sensor 1011, a gyroscope sensor 1012, a force sensor 1013, a fingerprint sensor 1014, an optical sensor 1015, and a proximity sensor 1016.

The acceleration sensor 1011 is configured to detect magnitude of accelerations on three coordinate axes of a coordinate system established by the terminal 1000. For example, the acceleration sensor 1011 is configured to detect components of gravitational acceleration on the three coordinate axes. The processor 1001 can control the display screen 1005 to display a user interface in a lateral view or a vertical view based on gravitational acceleration signals acquired by the acceleration sensor 1011. The acceleration sensor 1011 is further configured to acquire motion data of a game or a user.

The gyroscope sensor 1012 is configured to detect a body direction and a rotational angle of the terminal 1000. The gyroscope sensor 1012 can cooperate with the acceleration sensor 1011 to acquire a 3D action of the user on the terminal 1000. Based on the data acquired by the gyroscope sensor 1012, the processor 1001 can implement the following functions: motion sensing (such as changing the UI based on a tilt operation of the user), image stabilization during shooting, game control, and inertial navigation.

The force sensor 1013 is disposed on a side frame of the terminal 1000 and/or a layer under the display screen 1005. In the case that the force sensor 1013 is disposed on the side frame of the terminal 1000, a user's holding signal to the terminal 1000 is detected. The processor 1001 performs left/right hand recognition or a quick operation based on the holding signal acquired by the force sensor 1013. In the case that the force sensor 1013 is disposed on the layer under the display screen 1005, the processor 1001 controls an operable control on the UI based on a user's press operation on the display screen 1005. The operable control includes at least one of a button control, a scroll bar control, an icon control and a menu control.

The fingerprint sensor 1014 is configured to acquire a user's fingerprint. The user's identity is identified by the processor 1001 or by the fingerprint sensor 1014 based on the fingerprint acquired by the fingerprint sensor 1414. In the case that the user's identity is identified as a trusted identity, the user is authorized by the processor 1001 to perform a related sensitive operation. The sensitive operation includes unlocking the screen, viewing encrypted information, downloading software, payment, changing settings, and the like. In some embodiments, the fingerprint sensor 1014 is disposed on the front, rear, or side surface of the terminal 1000. In the case that the terminal 1000 is provided with a physical button or its manufacturer's logo, the fingerprint sensor 1014 is integrated with the physical button or its manufacturer's logo.

The optical sensor 1015 is configured to acquire intensity of ambient light. In one embodiment, the processor 1001 controls display brightness of the display screen 1005 based on the intensity of ambient light acquired by the optical sensor 1015. In some embodiments, in the case that the intensity of ambient light is relatively high, the display brightness of the display screen 1005 is increased. In the case that the intensity of ambient light is relatively low, the display brightness of the display screen 1005 is decreased. In another embodiment, the processor 1001 is further configured to dynamically adjust shooting parameters of the camera assembly 1006 based on the intensity of ambient light acquired by the optical sensor 1015.

The proximity sensor 1016, also referred to as a distance sensor, is generally disposed on the front panel of the terminal 1000. The proximity sensor 1016 is configured to acquire a distance between a user and the front surface of the terminal 1000. In one embodiment, in the case that the distance between the user and the front surface of the terminal 1000 detected by the proximity sensor 1016 gradually decreases, the display screen 1005 is controlled by the processor 1001 to switch from a screen-on state to a screen-off state. In the case that the distance between the user and the front surface of the terminal 1000 detected by the proximity sensor 1016 gradually increases, the display screen 1005 is controlled by the processor 1001 to switch from the screen-off state to the screen-on state.

It can be understood by a person skilled in the art that the structure shown in FIG. 10 does not constitute a limitation to the terminal 1000. More or less components than those illustrated may be included, or some components may be combined, or different component arrangements may be provided.

Figure 11:
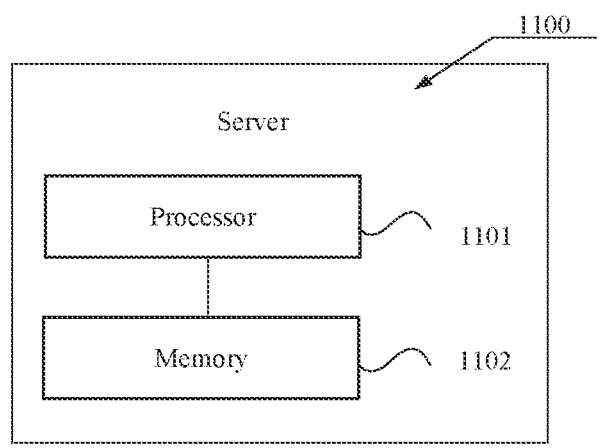
FIG. 11 is a block diagram of a server according to an exemplary embodiment of the present disclosure.

FIG. 11 is a block diagram of a server according to an exemplary embodiment of the present disclosure. Significant differences may be generated when the server 1100 has different configurations or performances. In some embodiments, the server 1100 includes one or more processors (CPUs) 1101 and one or more memories 1102 storing at least one of program code therein. The at least one of program code, when loaded and executed by the one or more processors 1101, causes the one or more processors 1101 to perform the execution process of the server in the method for live streaming according to each of the foregoing method embodiments. In some embodiments, the server 1100 further includes components such as a wired or wireless network interface, a keyboard, and an input/output interface for input and output. The server 1100 further includes other components for implementing device functions, which will not be described herein.

In an exemplary embodiment, a non-transitory computer-readable storage medium including program code is provided, such as the memory 1002 including program code or the memory 1102 including program code. The program code may be executed by the processor 1001 of the terminal 1000 or the processor 1101 of the server 1100 to perform the above methods for live streaming according to the above method embodiments. In some embodiments, the storage medium is a non-transitory computer-readable storage medium. For example, the non-transitory computer-readable storage medium may be a read-only memory (ROM), a random-access memory (RAM), a compact disc read-only memory (CD-ROM), a magnetic tape, a floppy disk, or an optical data storage device.

In an exemplary embodiment, a computer program product including a computer program is further provided, wherein the computer program, when executed by the processor 1001 of the terminal 1000 or the processor 1101 of the server 1100, causes the processor 1001 or the processor 1101 to perform the methods for live streaming according to the above method embodiments.

In an exemplary embodiment, a method for live streaming is provided. The method includes:

displaying an online tutorial portal of a target service in a live-streaming room of an anchor account;

in response to detecting a trigger operation on the online tutorial portal, sending an online tutorial request to a server, wherein the online tutorial request is configured to request the anchor account to provide an online tutorial for the target service;

acquiring video data by recording a current screen of a terminal in response to approval of the anchor account for the online tutorial request;

displaying, in the live-streaming room of the anchor account, the current screen of the terminal based on the video data; and in response to receiving the audio data of the anchor account, playing the audio data in the live-streaming room of the anchor account.

In some embodiments, the method further includes:

displaying a payment prompt message in the live-streaming room in response to the approval of the anchor account for the online tutorial request, wherein the payment prompt message is configured to indicate an amount of resources to be paid for initiating the online tutorial request; and acquiring the video data in response to detecting a payment success message based on the payment resource prompt message.

In some embodiments, the method further includes:

sending the video data to the server.

In some embodiments, the method further includes:

displaying a live-streaming screen of the anchor account in the live-streaming room of the anchor account;

switching a screen displayed in the live-streaming room to the live-streaming screen of the anchor account in response to an online tutorial end message, wherein the online tutorial end message is configured to indicate that the online tutorial for the target service is ended.

In some embodiments, the method further includes:

displaying an online tutorial scoring panel in the live-streaming room in response to an online tutorial end message, wherein the online tutorial end message is configured to indicate that the online tutorial for the target service is ended, the online tutorial scoring panel is configured to acquire a score of the current online tutorial, and the online tutorial scoring panel includes a plurality of scoring options; and in response to detecting a select operation on any of the plurality of scoring options, sending a score corresponding to the scoring option to the server.

In some embodiments, the method further includes:

displaying a ranking of scores of the target service, wherein the ranking of scores includes scores of a plurality of anchor accounts corresponding to the target service.

In an exemplary embodiment, a method for live streaming is provided. The method includes:

receiving an online tutorial request from any account in a live-streaming room of an anchor account, and sending the online tutorial request to a terminal corresponding to the anchor account, wherein the online tutorial request is configured to request the anchor account to provide an online tutorial for the target service;

acquiring video data of the account in response to approval of the anchor account for the online tutorial request, wherein the video data is acquired by recording a screen of a terminal corresponding to the account;

sending the video data to terminals of a plurality of accounts in the live-streaming room; and in response to receiving audio data of the anchor account, sending the audio data to the terminals of the plurality of accounts in the live-streaming room.

In some embodiments, the method further includes:

sending a payment prompt message to the terminal corresponding to the account in response to the approval of the anchor account for the online tutorial request, wherein the payment prompt message is configured to indicate an amount of resources to be paid for initiating the game online tutorial request.

In some embodiments, the method further includes:
receiving a score of the current game online tutorial; and
updating, based on the score, a ranking of scores to acquire an updated ranking of scores, wherein the ranking of scores includes scores of a plurality of anchor accounts corresponding to the target service.

In an exemplary embodiment, a method for live streaming is provided. The method is performed by an anchor terminal. The method includes:
displaying, in response to an online tutorial request of any one of accounts in a live-streaming room of an anchor account, a prompt message of the online tutorial request in the live-streaming room, wherein the online tutorial request is configured to request the anchor account to provide an online tutorial for a target service;
in response to detecting an approval operation on the prompt message, sending an approval message to a server, wherein the approval message is configured to indicate that the anchor account approves the online tutorial request;
in a case that video data of the any one of accounts is received, displaying a current screen of a terminal corresponding to the any one of accounts based on the video data, wherein the video data is acquired by recording the screen of the terminal corresponding to the account; and
acquiring audio data of the anchor account, and sending the audio data to the server to trigger the server to send the audio data of the anchor account to second terminals corresponding to a plurality of second accounts in the live-streaming room; and
playing, in response to receiving audio data of the any one of the accounts, the audio data of the any one of the accounts in the live-streaming room of the anchor account.

In some embodiments, the method further includes:
displaying an online tutorial button in the live-streaming room of the anchor account, wherein the online tutorial button is configured to activate an online tutorial function; and
in response to detecting a trigger operation on the online tutorial button, sending an online tutorial function activation message to the server, wherein the online tutorial function activation message is configured to indicate that the online tutorial function has been activated.

In some embodiments, the method further includes:
in response to detecting a trigger operation on the online tutorial button, displaying a resource amount input box in the live-streaming room, wherein the resource amount input box is configured to input a resource amount required for the online tutorial;
in response to detecting an input complete operation on the resource amount input box, acquiring the resource amount in the resource amount input box; and
sending an online tutorial function activation message carrying the resource amount to the server.

In some embodiments, displaying the prompt message of the online tutorial request in the live-streaming room comprises: displaying the prompt message of the online tutorial request in the live-streaming room in a form of a prompt box for the online tutorial request.

In some embodiments, the prompt box for the online tutorial request comprises an approve button, wherein said sending the approval message to the server in response to detecting the approval operation on the prompt message comprises: sending the approval message to the server in response to a click operation on the approve button in the prompt box for the online tutorial request.

All the embodiments of the present disclosure can be practiced individually or in combination with other embodiments, and these embodiments are all regarded as being within the protection scope of the present disclosure.

The invention claimed is:

1. A method for live streaming, performed by a first terminal, comprising:
displaying an online tutorial portal of a target service in a live-streaming room of an anchor account;
sending an online tutorial request to a server in response to detecting a trigger operation on the online tutorial portal, wherein the online tutorial request is configured to request the anchor account to provide an online tutorial for the target service;
acquiring video data by recording a current screen of the first terminal in response to approval of the anchor account for the online tutorial request, wherein the first terminal is a terminal to which a first account is logged in, and a user of the first account is a viewer in the live-streaming room;
displaying, in the live-streaming room of the anchor account, the current screen of the first terminal based on the video data such that an anchor of the anchor account is capable of seeing the current screen of the first terminal and providing a targeted tutorial based on actual operations of the user of the first account;
playing, in response to receiving audio data of the anchor account, the audio data of the anchor account in the live-streaming room of the anchor account; and
acquiring audio data of the first account corresponding to the first terminal, and sending the audio data of the first account to the server, to trigger the server to send the audio data of the first account to second terminals corresponding to a plurality of second accounts in the live-streaming room.

2. The method according to claim 1, wherein after sending the online tutorial request to the server in response to detecting the trigger operation on the online tutorial portal, the method further comprises:
displaying a resource payment prompt message in the live-streaming room in response to the approval of the anchor account for the online tutorial request, wherein the resource payment prompt message is configured to indicate an amount of resources to be paid for initiating the online tutorial request; and
acquiring the video data in response to detecting a payment success message based on the resource payment prompt message.

3. The method according to claim 1, wherein after acquiring the video data by recording the current screen of the first terminal in response to the approval of the anchor account for the online tutorial request, the method further comprises:
sending the video data to the server.

4. The method according to claim 1, wherein before displaying, in the live-streaming room of the anchor account, the current screen of the first terminal based on the video data, the method further comprises:
displaying a live-streaming screen of the anchor account in the live-streaming room of the anchor account; and
after displaying, in the live-streaming room of the anchor account, the current screen of the first terminal based on the video data, the method further comprises:
switching a screen displayed in the live-streaming room to the live-streaming screen of the anchor account in response to an online tutorial end message, wherein the online tutorial end message is configured to indicate that the online tutorial for the target service is ended.

5. The method according to claim 1, wherein after displaying, in the live-streaming room of the anchor account, the current screen of the first terminal based on the video data, the method further comprises:

displaying an online tutorial scoring panel in the live-streaming room in response to an online tutorial end message, wherein the online tutorial end message is configured to indicate that the online tutorial for the target service is ended, the online tutorial scoring panel is configured to acquire a score of a current online tutorial, and the online tutorial scoring panel comprises a plurality of scoring options; and sending, in response to detecting a select operation on any of the plurality of scoring options, a score corresponding to the scoring option to the server.

6. The method according to claim 1, wherein after displaying, in the live-streaming room of the anchor account, the current screen of the first terminal based on the video data, the method further comprises:

displaying a ranking of scores of the target service, wherein the ranking of scores comprises scores of a plurality of anchor accounts corresponding to the target service.

7. The method of claim 1, wherein before acquiring video data by recording a current screen of the first terminal in response to approval of the anchor account for the online tutorial request, the method comprises:

activating a preset application of the online tutorial and displaying an interface of the preset application on the first terminal.

8. A method for live streaming, performed by a server, comprising:

receiving an online tutorial request from a first account in a live-streaming room of an anchor account, and sending the online tutorial request to an anchor terminal corresponding to the anchor account, wherein the online tutorial request is configured to request the anchor account to provide an online tutorial for a target service, wherein the a user of the first account is a viewer in the live-streaming room who needs the online tutorial;

acquiring video data of the first account in response to approval of the anchor account for the online tutorial request, wherein the video data is acquired by recording a current screen of a first terminal corresponding to the first account for displaying in the live-streaming room such that an anchor of the anchor account is capable of seeing the current screen of the first terminal and providing a targeted tutorial based on actual operations of the user of the first account;

sending the video data to second terminals corresponding to a plurality of second accounts in the live-streaming room;

sending, in response to receiving audio data of the anchor account, the audio data of the anchor account to the second terminals; and sending, in response to receiving audio data of the first account, the audio data of the first account to the second terminals.

9. The method according to claim 8, wherein after receiving the online tutorial request from the first account in the live-streaming room of the anchor account, and sending the online tutorial request to the anchor terminal corresponding to the anchor account, the method further comprises:

sending a resource payment prompt message to the first terminal in response to the approval of the anchor account for the online tutorial request, wherein the resource payment prompt message is configured to indicate an amount of resources to be paid for initiating the online tutorial request.

10. The method according to claim 8, wherein after sending the video data to the second terminals corresponding to the plurality of second accounts in the live-streaming room, the method further comprises:

receiving a score of a current online tutorial; and updating, based on the score, a ranking of scores to acquire an updated ranking of scores, wherein the ranking of scores comprises scores of a plurality of anchor accounts corresponding to the target service.

11. A method for live streaming, performed by an anchor terminal, comprising:

displaying, in response to an online tutorial request of a first account in a live-streaming room of an anchor account, a prompt message of the online tutorial request in the live-streaming room, wherein the online tutorial request is configured to request the anchor account to provide an online tutorial for a target service, wherein the a user of the first account is a viewer in the live-streaming room who needs the online tutorial;

sending an approval message to a server in response to detecting an approval operation on the prompt message, wherein the approval message is configured to indicate that the anchor account approves the online tutorial request;

displaying, in response to receiving video data of the first account, a current screen of a first terminal corresponding to the first account based on the video data such that an anchor of the anchor account is capable of seeing the current screen of the first terminal and providing a targeted tutorial based on actual operations of the user of the first account, wherein the video data is acquired by recording the current screen of the first terminal;

acquiring audio data of the anchor account and sending the audio data of the anchor account to the server, to trigger the server to send the audio data of the anchor account to second terminals corresponding to a plurality of second accounts in the live-streaming room; and playing, in response to receiving audio data of the first account, the audio data of the first account in the live-streaming room of the anchor account.

12. The method according to claim 11, wherein before displaying, in response to the online tutorial request of the first account in the live-streaming room of the anchor account, the prompt message of the online tutorial request in the live-streaming room, the method further comprises:

displaying an online tutorial button in the live-streaming room of the anchor account, wherein the online tutorial button is configured to activate an online tutorial function; and sending an online tutorial function activation message to the server in response to detecting a trigger operation on the online tutorial button, wherein the online tutorial function activation message is configured to indicate that the online tutorial function has been activated.

13. The method according to claim 12, wherein after displaying the online tutorial button in the live-streaming room of the anchor account, the method further comprises:

displaying a resource amount input box in the live-streaming room in response to detecting the trigger operation on the online tutorial button, wherein the resource amount input box is configured to input a resource amount required for the online tutorial;

acquiring the resource amount in the resource amount input box in response to detecting an input complete operation on the resource amount input box; and sending an online tutorial function activation message carrying the resource amount to the server.

14. The method according to claim 11, said displaying the prompt message of the online tutorial request in the live-streaming room comprises:

displaying the prompt message of the online tutorial request in the live-streaming room in a form of a prompt box for the online tutorial request.

15. The method according to claim 14, wherein the prompt box for the online tutorial request comprises an approve button; and said sending the approval message to the server in response to detecting the approval operation on the prompt message comprises:

sending the approval message to the server in response to a click operation on the approve button in the prompt box for the online tutorial request.

* * * * *